United States Patent [19]

Heidlas et al.

[11] Patent Number: 5,626,756
[45] Date of Patent: May 6, 1997

[54] PROCESS FOR FRACTIONATING AND REFINING NATURAL LIPID SUBSTANCES

[75] Inventors: Jürgen Heidlas, Trostberg; Georg Huber, Altenmarkt, both of Germany

[73] Assignee: SKW Trostberg Aktiengesellschaft, Trostberg, Germany

[21] Appl. No.: 578,077

[22] Filed: Dec. 27, 1995

[30] Foreign Application Priority Data

Dec. 29, 1994 [DE] Germany .................. 44 47 116.5

[51] Int. Cl.$^6$ .................................. B01D 11/00
[52] U.S. Cl. ............... 210/634; 210/774; 426/442; 426/475; 426/478; 426/492; 426/417
[58] Field of Search ................... 210/634, 774, 210/787, 511; 426/417, 422, 442, 478, 475, 492

[56] References Cited

U.S. PATENT DOCUMENTS

| | | |
|---|---|---|
| 2,560,935 | 7/1951 | Dickinson . |
| 2,660,590 | 11/1953 | Dickinson . |
| 3,939,281 | 2/1976 | Schwengers ............... 426/417 |
| 4,547,292 | 10/1985 | Zarchy ...................... 210/634 |
| 4,714,617 | 12/1987 | Gahrs ........................ 426/427 |
| 4,877,530 | 10/1989 | Moses ....................... 210/634 |
| 4,898,673 | 2/1990 | Rice et al. ................. 210/634 |
| 5,024,846 | 6/1991 | McLachlan et al. ....... 426/417 |
| 5,138,075 | 8/1992 | Ohgaki et al. ............. 210/774 |
| 5,271,903 | 12/1993 | Durst et al. ................ 422/81 |
| 5,290,959 | 3/1994 | Rice .......................... 426/417 |
| 5,405,633 | 4/1995 | Heidlas et al. ............. 426/417 |
| 5,478,585 | 12/1995 | Isono et al. ................ 426/417 |

FOREIGN PATENT DOCUMENTS 156374 10/1985 European Pat. Off. .

*Primary Examiner*—Ana Fortuna
*Attorney, Agent, or Firm*—Felfe & Lynch

[57] ABSTRACT

In order to fractionate or/and refine natural lipid materials by extraction with compressed gases, the natural materials are used in a liquid form and they are extracted with a liquid mixture of 50 to 90% by weight propane and 10 to 50% by weight carbon dioxide which is in a subcritical state.

11 Claims, No Drawings

PROCESS FOR FRACTIONATING AND REFINING NATURAL LIPID SUBSTANCES

BACKGROUND OF THE INVENTION

The invention concerns a process for fractionating or refining natural lipid substances such as e.g. fats or oils by liquid/liquid extraction with a mixture of the two compressed gases propane and carbon dioxide.

When oils and fats are isolated on a technical scale from vegetable, animal or microbial natural substances either by extraction using solvents or mechanically by means of pressing, the crude product usually has to be requires purification in order to achieve an adequate quality. For purification various process steps are usually carried out within the framework of a so-called refining in order to separate undesired accompanying substances such as phospholipids (degumming) or dyes (bleaching).

Apart from these conventional working methods, for a long time processes have been described which use compressed gases to refine oils and fats (U.S. Pat. Nos. 2,660,590 and 2,548,434). According to the processes published in these patents the reverse solubility characteristics of compressed propane in the region of the critical state data (Tc: 96° C., Pc=42 bar) are utilized to refine oils i.e. in particular to separate phospholipids and dyes.

The process according to DE-PS 10 69 629 is based on the same principle in order to achieve a fractionation of oily mixtures of higher molecular organic compounds. In DE-OS 42 22 153 compressed propane is also proposed under similar state conditions for deoiling oil-containing phospholipids.

Despite the relatively favorable process pressures and the comparably high solvent capacity, these processes generally have the disadvantage that they require relatively high process temperatures in order to achieve the desired extraction goal particularly when the content of the substances to be separated is relatively low such as e.g. in the case of phospholipids and dyes in the natural starting materials. In addition, the selectivity of propane near the critical region is too low in many cases to obtain satisfactory results.

In contrast to propane, supercritical carbon dioxide generally has a very high selectivity and has often been proposed for refining oils and fats (cf. for example Stahl, E., Quirin, K.-W., Gerard, D. "Verdichtete Gase zur Extraktion und Raffination, Springer Verlag, Berlin, 1988). However, the key problem in using supercritical carbon dioxide is the fact that it only has a solubilizing power for lipid materials at relatively high process pressures and thus the cost effectiveness of the corresponding processes is unsatisfactory in most cases.

In order to circumvent the disadvantages of pure supercritical carbon dioxide and compressed propane, it has already also been suggested in DE-OS 34 11 755 that a mixture of supercritical carbon dioxide and a subcritical entraining agent, in particular propane, is used to deoil crude lecithin. However, in this process modification the pressures are also still relatively high, namely between 50 and 800 bar and preferably between 80 and 200 bar.

Finally it is known from the German laid-open patent applications DE 43 16 620 and DE 43 16 621 that squalene can be extracted from olive oil residues and that extracts from the fruits of the saw-tooth palm can be preserved using carbon dioxide and possibly also with carbon dioxide/propane mixtures. In the two processes a liquid/liquid extraction is carried out in a column with a temperature gradient such that the extraction gas is present near the bottom in a subcritical state and in a supercritical state at the top of the column in order to achieve an effective separation. The necessary process pressure is between 40 and 350 bar and is preferably between 90 and 160 bar. Preferred process temperatures are stated as being 20° to 80° C. It is quite apparent that in this process the proximity to the critical state of the extraction gas is a prerequisite for an efficient separation. Thus the process pressures are, however, always considerably higher than with an extraction with subcritical propane which can usually be carried out with pressures of <40 bar.

The object of the invention is therefore to provide a process for fractionating or/and refining natural lipid substances by liquid/liquid extraction with compressed gases which does not have the said disadvantages of the state of the art but instead enables an effective fractionation and refining of natural materials under relatively low pressures and under mild process temperatures so that the cost-effectiveness of the process conditions is also considerably improved.

THE INVENTION

The above stated object is obtained according to the invention by extracting the natural lipid materials in a liquid state with a mixture comprising 50 to 90% by weight propane and 10 to 50% by weight carbon dioxide in a subcritical state of the gas mixture. It has surprisingly turned out that a high solvent capacity and thus a good space/time yield and concurrently an effective separation of undesired accompanying substances from the lipid starting material is also possible under relatively mild process conditions with regard to pressure and temperature.

In the process of the invention, the lipid starting material, which is preferably an oil or fat, is extracted in a liquid or liquefied state using a compressed gas mixture comprising 50 to 90% by weight propane and 10 to 50% by weight carbon dioxide as the solvent. An important feature of the invention is that the gas mixture in this process is in a subcritical state with regard to both pressure and temperature. In this way it is possible in an economically useful manner to decisively improve the selectivity compared to compressed propane alone. In this connection the extraction conditions can be varied within wide limits with regard to pressure and temperature. The extraction pressure is preferably between 20 and 65 bar and the extraction temperature between 10° and 80° C. If, according to a preferred embodiment, propane is used in a proportion of 60 to 80% by weight and carbon dioxide is used in a proportion of 20 to 40% by weight, the preferred pressure range is between 30 and 55 bar and the preferred temperature range is between 30° and 65° C.

According to the invention, it is possible to use very much milder temperatures compared to an extraction with propane alone since the selectivity of the extraction medium is no longer determined by the reverse solvent properties of propane in the vicinity of the critical temperature of 96° C. but, by the proportion of liquid carbon dioxide. In contrast to an extraction with supercritical carbon dioxide, the process according to the invention is carried out at considerably lower process pressures without having to make any reductions at all with regard to selectivity.

The amount of gas which is required to achieve an adequate solvent capacity can be varied within relatively wide limits and essentially depends on the starting material, the gas composition and the extraction aim. The preferred amounts of gas are between 1 to 25 g of the propane/carbon dioxide mixture per g of the starting material to be treated.

A particular advantage of the process according to the invention is furthermore that it is possible not only to vary the pressure and temperature but also the gas composition of the extraction medium so that it is possible to set optimal conditions for the respective extraction by an appropriate selection of these three variables. In this connection it should be noted that the temperature of the gas mixture required for selectivity increases with decreasing carbon dioxide concentration. Therefore when the carbon dioxide concentration is relatively low, a higher process temperature is often necessary to achieve a particular selectivity than at a higher carbon dioxide concentration. The selectivity properties change at low carbon dioxide concentrations (<20% by weight) as for compressed propane: the solubilizing power decreases with increasing temperature and the selectivity increases. In contrast a higher process temperature is no longer necessary to improve the selectivity at a higher carbon dioxide concentration (more than 20 to 50% by weight) and it is possible to work between 30° and 65° C.

According to a preferred embodiment the liquid/liquid extraction is carried out in a countercurrent extraction column. If a temperature gradient is also set up in such a column, the separation efficiency of the extraction medium is additionally improved.

In this particularly preferred embodiment, a lower temperature is selected at the bottom than at the top of the column. The temperature gradient can be up to 20° C. but in this case the state conditions must always be subcritical even at the top of the column.

After extraction in a column, the product, which is obtained at the bottom, and parameter-specific amounts of extraction gas are withdrawn from the column with the aid of suitable devices. The extraction gas mixture is preferably recovered in this process. The product from the top of the column which contains considerably more extraction gases than the product of the bottom is advantageously fed into an extract separator for isolation in which the liquid gas is evaporated by a temperature increase and/or pressure decrease. The preferred separation temperature in this process is less than 60° C. and the preferred separation pressure is between 8 and 30 bar.

During the separation, the extracts of the column top product precipitate from the gaseous extraction agent in the process of which the non-loaded gas mixture is recovered again and can be returned to the extraction to increase the cost-effectiveness i.e. the extraction agent is recycled.

The process according to the invention which is preferably carried out continuously is suitable for a wide range of applications in the field of vegetable, animal and microbial lipids. In addition to phospholipids (lecithins), dyes such as e.g. β-carotene can also be separated from an oil or liquefied fat phase. Furthermore it is possible to isolate monoglycerides and diglycerides, the more polar components accumulating as the product of the bottom in a column fractionation. In addition, the process according to the invention even allows a fractionation of triglycerides. In this case the more strongly unsaturated glycerides accumulate in the product of the bottom of the column fractionation.

Particular advantages of the process according to the invention are low process pressures and temperatures as well as a high solvent capacity which are associated with good space/time yields and an exceptional cost-effectiveness of the process. In addition the process according to the invention is distinguished by a particularly high selectivity i.e. the substantial separation of undesired accompanying substances such as phospholipids or dyes and a good fractionation of partial glycerides (monoglycerides or diglycerides).

The following examples are intended to further elucidate the process according to the invention.

EXAMPLES

Example 1

Degumming crude soya oil

A gas mixture comprising 75% by weight propane and 25% by weight carbon dioxide liquefied at a process pressure of 35 bar is passed through a high pressure extraction column (empty tube volume 2l) from bottom to top at a mass flow of 2.5 kg/h. The column is tempered with a temperature gradient of 15° C. by means of a suitable heater. The temperature is adjusted to 35° C. at the bottom and to 50° C. at the top of the column. Crude soya oil (hexane-extracted) with a phosphorus content of 450 ppm is fed approximately into the middle part of the column at a mass flow of 300 g/h in a countercurrent. The soya oil dissolves under these conditions and is passed out of the column top with the flow of the compressed gas. The phospholipids (lecithins) are not dissolved and precipitate as finely dispersed droplets against the flow of the compressed gas at the bottom of the column from which they can be withdrawn as a nearly oil-free powder by means of a suitable device. The head product is led into an extract separator in which the extraction medium is converted into a gaseous state by reducing the pressure to 15 bar at a temperature of 45° C. during which the degummed soya oil precipitates. The gaseous extraction gas is subsequently liquefied again by a condenser, led into a buffer container, adjusted again to the defined mixing ratio and used again as a medium for the fractionation.

The analysis of the head product yields as phosphorus content <5 ppm. The oil content in the product of the bottom is <5% by weight (determined as acetone-soluble components).

Example 2

Fractionation of oils containing β-carotene

A gas mixture composed of 60% by weight propane and 40% by weight carbon dioxide is used at a pressure of 55 bar and a mass flow of 2 kg/h in a high pressure plant with a column similar to that of example 1. The column is tempered in a temperature gradient. The temperature in the column top is 60° C. and 40° C. near the column bottom. A microbial oil having a β-carotene content of 10,000 ppm (1%) is fed into the middle at a mass flow of 200 g/h. Under these conditions the β-carotene is less soluble than the accompanying oil and therefore accumulates in the bottom of the column. An oil phase can be withdrawn from the bottom of the column which is enriched in β-carotene to 10%. The β-carotene-enriched top product contains <500 ppm β-carotene and is separated as described in example 1 in an extract separator at 15 bar and 45° C. Pure β-carotene can be isolated from the concentrated β-carotene from the product of the bottom by recrystallization.

It will be understood that the specification and examples are illustrative but not limitative of the present invention and that other embodiments within the spirit and scope of the invention will suggest themselves to those skilled in the art.

We claim:

1. A process for fractionating and/or refining a natural lipid substance, comprising:

extracting the natural substance, which is in a liquid form, by contacting the natural substance with a liquid mixture of 50 to 90% by weight propane and 10 to 50% by weight carbon dioxide which is in a subcritical state with respect to temperature and pressure.

2. The process of claim 1, wherein the extraction is carried out at a pressure between 20 and 65 bar and a temperature between 10° and 80° C.

3. The process of claim 1, wherein the liquid mixture is 60 to 80% by weight propane and 20 to 40% by weight carbon dioxide.

4. The process of claim 2, wherein the extraction is carried out at a pressure between 30 and 55 bar and a temperature between 30° and 65° C.

5. The process of claim 1, wherein 1 to 25 g of the propane-carbon dioxide mixture is used per g of the lipid starting material to be extracted.

6. The process of claim 1, wherein the extraction is carried out in a high-pressure extraction column in a countercurrent manner.

7. The process of claim 6, wherein there is a temperature gradient of up to 20° C. in the extraction column.

8. The process of claim 1, wherein the extracted lipid components are separated by an increase in temperature and/or a decrease in pressure of the extraction gases.

9. The process of claim 8, wherein the separation temperature is <60° C. and the separation pressure is between 8 and 30 bar.

10. The process of claim 1, wherein the liquid/liquid extraction is carried out continuously.

11. The process of claim 1, wherein the extraction gas mixture is recycled again for a new extraction after separation of the extracted components.

* * * * *